United States Patent Office 3,555,001
Patented Jan. 12, 1971

3,555,001
PROCESS FOR THE FRACTIONATION OF PLASMA AND SERUM USING WATER-INSOLUBLE POLY-ELECTROLYTES CONTAINING DILOWERAL-KYLAMINOLOWERALKYLIMIDE GROUPS
Craig Wallis and Joseph L. Melnick, Houston, Tex., assignors to Monsanto Company, St. Louis, Mo., a corporation of Delaware
No Drawing. Filed May 29, 1969, Ser. No. 829,147
Int. Cl. C07g 7/00
U.S. Cl. 260—112                                    18 Claims

ABSTRACT OF THE DISCLOSURE

Fluids such as plasma or serum containing a plurality of proteins are fractionated by contacting the fluid with a water-insoluble polyelectrolyte polymer containing basic groups to selectively sorb specific protein on the polymer to the exclusion of other specific protein and where necessary removing the polymer containing the sorbed protein from the fluid. The polymer contains basic groups and is polycationic or polyampholytic in nature and contains imide groups in the form of diloweralkylaminoloweralkyl-imide groups or loweralkyliminodi(loweralkylamide) linkages.

BACKGROUND OF THE INVENTION

Field of the invention

This invention relates to a process for fractionating plasma or serum. In a particular aspect this invention relates to selectively removing plasma or serum protein from other plasma or serum protein by contacting plasma or serum containing a plurality of non-viral proteins with a water-insoluble polyelectrolyte polymer containing basic groups, hereinafter sometimes referred to as a basic polyelectrolyte polymer, thereby to selectively sorb specific non-viral plasma or serum protein to the substantial exclusion of other specific non-viral plasma or serum protein. The polymer is polycationic or polyampholytic in nature and contains imide groups selected from the group consisting of diloweralkylaminolower-alkylimide groupings and loweralkyliminodi(loweralkyl-imide) linkages.

Description of the prior art

Mammalian plasma and serum (plasma from which fibrinogen and blood cells have been removed) contain numerous proteins such as albumins, lipoproteins and globulins. Because of the medical value of certain blood protein fractions, in particular the globulins, which are useful as immune sera and in the treatment of hemophilic cases, and the albumins which are useful in the treatment of shock, various procedures usually involving precipitation of a particular fraction have been devised for fractionating plasma and serum. For example, in the case of human blood serum the proteins are in solution which has a salt content of approximately 0.17 mole per liter. The globulins present in the solution can be removed by precipitation and the albumins left in the solution if substantially all of the salts are first removed from the serum. While precipitation procedures are generally successful in separating globulins from albumins, the procedure fails to yield pure globulin fractions due to the fact that other serum proteins are precipitated from the serum along with the globulins.

It is, therefore, desirable to provide a process for fractionating plasma or serum whereby one or more proteins are selectively obtained.

SUMMARY OF THE INVENTION

The present invention resides in the discovery that specific non-viral protein is selectively separated from other non-viral protein in a fluid medium selected from the group consisting of plasma and serum by contacting the fluid medium with a water-insoluble basic polyelectrolyte polymer to selectively sorb specific protein to the exclusion of other specific protein and thereby produce a serum containing in solution the non-sorbed protein. Useful polymers are polycationic or polyampholytic in nature and contain imide groups in the form of diloweralkylaminoloweralkylimide groups or loweralkyliminodi-(loweralkylimino) linkages.

DETAILED DESCRIPTION

The polyelectrolyte polymer used in the present invention is water-insoluble. Many of the normally water soluble polyelectrolyte polymers are converted to the water-insoluble form by introduction of sufficient crosslinks in known manner. Crosslinking may be accomplished either during the preparation of the polymer or by subsequent treatment of the polymer to make the polymer insoluble in water. Typical crosslinking agents include divinylbenzene, ethylene diamine and methyliminobis-propylamine. Other crosslinking agents are known from U.S. Pat. 3,165,486. When methyliminobispropylamine or other loweralkyliminobisloweralkylamine is employed as the crosslinking agent, loweralkyliminodi(loweralkyl-imide) linkages are introduced into the polymer. The water insolubility of the polymer can be varied by regulation of the degree of crosslinking of the polymer. The term "water-insoluble" as used herein is taken to means that the polymer concerned does not dissolve in water or aqueous solution even though it may have such characteristics as a high degree of swelling due to solvation by water, even to the extent of existence in a gel form. Such characteristics are typically imparted by crosslinking.

By "polyelectrolyte" it is intended to include only polymeric organic substances which when contacted with an aqueous medium or aqueous alkaline or aqueous acidic medium possess organic ions having electrical charges distributed at a plurality of positions thereon.

Copolymers herein are frequently conveniently identified in terms of their monomeric constituents. The names so applied refer to the molecular structure and are not limited to the polymers prepared by the copolymerization of the specified monomers. In many instances the identical copolymers may be prepared from other monomers and converted by subsequent chemical reaction to the desired copolymer.

Polyelectrolyte polymers which are preferred for use in the present invention are basic polymeric polyelectrolytes selected from the group consisting of (a) a polymerized unsaturated carboxylic acid or anhydride and an imide derivative of a polymerized unsaturated carboxylic acid or anhydride, (b) an imide derivative of a polymerized unsaturated carboxylic acid or anhydride and, (c) a copolymer of (1) an unsaturated monomer having, for example 2 to 30 carbon atoms and (2) a monomer selected from the group consisting of (a) an unsaturated carboxylic acid or anhydride and an imide derivative of an unsaturated carboxylic acid or anhydride and (b) an imide derivative of an unsaturated carboxylic acid or anhydride. Preferably the polyelectrolyte polymer has an average molecular weight of at least 1,000 and a degree of polymerization of at least 8. The polyelectrolyte polymer contains imide groups as diloweralkylaminoloweralkylimide groupings or as loweralkyliminodi(loweralkylimide) linkages. It is preferred that the polymer, that is the reactive sites in the polymer, contain a substantial number (e.g. about 2–100%) of diloweralkylaminoloweralkylimide groups.

The polyelectrolyte polymer may advantageously be an EMA-type polymer.

Among the EMA-type polymers suitable for the practice of the present invention are polymeric polyelectrolytes subject to the previously noted requirements having units of the formula:

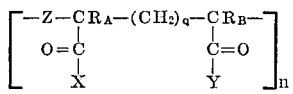

wherein: $R_A$ and $R_B$ are selected from the group consisting of hydrogen, halogen (preferably chlorine), alkyl of 1 to 4 carbon atoms (preferably methyl), cyano, phenyl, or mixtures thereof; provided that not more than one of $R_A$ and $R_B$ is phenyl; Z is a bivalent radical (preferably alkylene, phenylalkylene, alkoxyalkylene, and aliphatic acyloxyalkylene) of 1 to 18 carbon atoms, preferably a bivalent carbon chain of 1 to 4 carbon atoms inclusive, which is a part of a unit containing 1–18 carbon atoms, inclusive, $q$ is a zero or one, X and Y are selected from hydroxy, —O alkali metal, OR,
—OH—NH$_3$, —OH—R$_3$N, —OH—R$_2$—RNH,
—OH—RNH$_2$, —NRR', —(Q)$_p$—W—(NR'R')$_x$
and —(Q)$_p$—W—(—OH)$_x$ wherein $x$ is 1 to 4 and $p$ is zero or one, wherein R is selected from the group consisting of alkyl, phenylalkyl, or phenyl, the alkyl group containing 1 to 18 carbon atoms, wherein R' is H or R, wherein Q is oxygen or —NR'—, and wherein W is a bivalent radical preferably selected from alkylene, phenylene and phenylalkene having up to 20 carbon atoms, X and Y taken together can be oxygen or —NR—, —N—W—(NR'R')$_x$, or —N—W—(NR'R'R'')$_x^+$ wherein R, W, R' have the meanings previously assigned and R'' is alkyl of 1 to 18 carbon atoms, benzyl or aromatic-substituted benzyl. The units of the formula given above are recurring, $n$ being as least 8 and can be as much as 100,000 degrees of polymerization. When the units are recurring the symbols in the various recurring units do not necessarily stand for the same thing in all of the recurring units.

Many of these polymers suitable for the practice of the present invention or suitable after conversion to derivatives are commercially available. Such polymers containing the requisite imide groups are water-insoluble and polycationic or polyampholytic in nature.

The polycarboxylic acid polymers can be of the non-vicinal-type including those containing monomer units, such as acrylic acid, acrylic anhydride, methacrylic acid, crotonic acid or their respective derivatives, including partial salts, amides and esters or of the vicinal type, including maleic, itaconic, citraconic, a-dimethyl maleic, a-butyl maleic, a-phenyl maleic, fumaric, aconitic, a-chloromaleic, a-bromomaleic, a-cyanomaleic acids including their salts, amides and esters. Anhydrides of the foregoing acids are also advantageously employed.

Co-monomers suitable for use with the above polycarboxylic acid monomers include a-olefins, such as ethylene, 2-methyl-pentene-1, propylene, butylene, 1-or 2-butene, 1-hexene, 1-octene, 1-decene, 1-dodecene, 1-octadecene, and other vinyl monomers, such as styrene, a-methyl styrene, vinyltoluene, vinyl acetate, vinyl chloride, vinyl formate, vinyl alkyl ethers, e.g., methylvinylether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said carboxylic acids or derivatives may be copolymerized with any of the other monomers described above, and any other monomer which forms a copolymer with carboxylic acids or deriviatives. Although these copolymers can be prepared by direct polymerization of the various monomers, frequently they are more easily prepared by an after-reaction modification of an existing copolymer. Copolymers are conveniently identified in terms of their monomeric constituents. The names so applied refer to the molecular structure and are not limited to the polymers prepared by the copolymerization of the specified monomers.

The initial copolymers of anhydrides and another monomer can be converted to carboxyl-containing copolymers by reaction with water, and to ammonium, alkali and alkaline earth metal and alkylamine salts thereof by reaction with alkali metal compounds, alkaline earth metal compounds, amines or ammonia. Other suitable derivatives of the above polymers include the alkyl or other esters and amides, alkyl amides, dialkyl amides, phenylalkyl amides or phenyl amides prepared by reacting carboxyl groups on the polymer chain with the selected amines or alkyl or phenylalkyl alcohol, as well as amino esters, amino amides, hydroxy amides and hydroxy esters, wherein the functional groups are separated by alkylene, phenyl, phenylalkyl, phenylalkylphenyl, or alkylphenylalkyl or other aryl groups. Moieties bearing amine or amine salts including quaternary salt groups are conveniently formed by reaction of the carboxyls of their anhydride precursors, where applicable with polyfunctional amines such as dimethylaminopropylamine at higher temperatures forming an imide linkage with vicinal carboxyls. Such pendant free amine groups can then be converted, if desired, to their simple or quaternary salts.

Representative EMA-type carboxylic acid or anhydrideolefin polymers, especially maleic acid or anhydride-olefin polymers of the foregoing type are known, for example, from U.S. Pats. 2,378,629; 2,396,785; 3,157,595; and 3,340,680. Generally, the copolymers are prepared by reacting ethylene or other unsaturated monomer, or mixtures thereof, with the acid anhydride in the presence of a peroxide catalyst in an aliphatic or aromatic hydrocarbon solvent for the monomers but nonsolvent for the interpolymer formed. Suitable solvents include benzene, toluene, xylene, chlorinated benzene and the like. While benzoyl peroxide is usually the preferred catalyst, other peroxides such as acetyl peroxide, butyryl peroxide, ditertiary butyl peroxide, lauroyl peroxide and the like, or any of the numerous azo catalysts, are satisfactory since they are soluble in organic solvents. The copolymer preferably contains substantially equimolar quantities of the olefin residue and the anhydride residue. Generally, it will have a degree of polymerization of 8 to 100,000 preferably about 100 to 5,000 and a molecular weight of about 1,000 to 1,000,000, preferably about 10,000 to 500,000. The properties of the polymer, such as molecular weight, for example, are regulated by proper choice of the catalyst and control of one or more of the variables such as ratio of reactants, temperature, and catalyst concentration or the addition of regulating chain transfer agents, such as diisopropyl benzene, propionic acid, alkyl aldehydes, or the like. Numerous of these polymers are commercially available.

Derivatives containing basic or cationic groups can be prepared by any convenient procedure. Representative derivatives of polymers employed in the present invention are known to the art, for example, from U.S. Pat. 3,398,092. As already indicated at least a portion of the basic groups are diloweralkylaminoloweralkylimide groupings or loweralkyliminodi(loweralkylimide) linkages. It is preferred that the polymer contain a substantial number (e.g. 2–100% of the reactive sites) of diloweralkylaminoloweralkylimide groupings. Such preferred products are further illustrated by the following general examples.

Partial imides of a starting carboxyl or carboxylic acid anhydride containing polymer, e.g., EMA, are produced by:

(A) Heating a limiting amount of a secondary or tertiary aminoloweralkylamine with the anhydride or carboxyl-containing form of the polymer in a suitable solvent (e.g., xylene) at a temperature of about 140–150° C. until water is no longer given off. Such a reaction simultaneously results in formation of imide groups in proportion to the amount of amine added and in the reformation of anhydride groups for the remainder of the polymer units. In this manner, imide-polymer products are formed which typically possess 2–100% imide linkages, the remaining carboxyl groups, when present, being in the anhydride form.

(B) Alternatively, a partial amide polymer product may be converted to the partial imide polymer product by heating a partial amide-polymer product in vacuo at 140–150° C. until water is no longer given off. Such an imide polymer product likewise possesses comparable proportions of imide and anhydride groups depending upon the number of amide groups originally contained in the starting partial amide-polymer product.

Partial secondary or tertiary aminoloweralkylamides of the starting carboxyl or carboxylic acid anhydride-containing polymer, e.g., EMA, are obtained by contacting the polymer with a limiting amount of the selected amine in suspension in a solvent such as benzene or hexane, resulting in formation of a partial amide-acid-anhydride derivative of the polymer, or a corresponding amide-carboxylate derivative thereof. The number of amide groups is dependent upon the quantity of the amine used as compared with the quantity of polymer employed. Such amide-polymer products typically comprise 2–100% amide groups, with remaining carboxyl groups being present as acid or anhydride groups.

Suitable blocking and unblocking of the amine moiety of the reactant employed in preparing amides or imides may be effected when required. Residual, non-modified, polymer units may optionally be converted to neutral groups or units by attachment to the polymer molecule of compounds including alkylamines, aminoalcohols, and alcohols.

Alternatively, additional cationic character can be provided in the polymer through incorporation of monomers which impart a basic or cationic character such as C-vinyl pyridines, vinyl amine, the several amino-substituted vinyl benzenes (or toluenes, etc.), amine-bearing acrylates (or methacrylates, etc.), vinyl imidazole, etc.

Thus, in any event, the polymer product will have residual active or reactive groups which may be of various types, including mixtures, but these residual active or reactive groups or residual "reactive sites" in the polymer will in one way or another comprise a certain percentage which are of a basic nature, so as to impart the requisite basic nature to the polymer product.

Especially preferred polymers subject to the previously referred to requirements are selected from the group consisting of ethylene/maleic acid or anhydride copolymers, styrene/maleic acid or anhydride copolymers, methylpentene/maleic acid or anhydride copolymers, and isobutylene/maleic acid or anhydride copolymers.

As will be apparent from the foregoing, the essential basic groups of the polycationic or polyampholytic polyelectrolyte (PE) employed are of an imide nature, involving diloweralkylaminoloweralkylimide groupings, as produced by reacting a diloweralkylaminoloweralkylamine with the carboxyl groups of a pre-formed polymer or by polymerizing an unsaturated olefin with an unsaturated anhydride or acid having such pre-formed imide groups in at least a portion of the unsaturated polycarboxylic acid reactant. According to the invention, such groups are preferred for purposes of the invention.

Alternatively, whether such groups are or are not present, imide groups may be provided by crosslinking the polymer with a loweralkyliminobis(loweralkylamine), which in the process of crosslinking by reaction between the terminal amine groups of the crosslinker and carboxyl groups in the polymer chain is productive of imino groups at both ends of the crosslinking chain with formation of the desired loweralkyliminobis(loweralkylimide) linkages. Other groups, such as diloweralkylaminoloweralkylamide groups, from which the desired imide groups may be obtained by heating at elevated temperatures, may also be present. Also, diloweralkylaminoloweralkyl ester groups may be present, as well as other groups, so long as the prescribed percentages of imide groups of the prescribed type are also present in the PE molecule as well as the residual acid groups of the starting unsaturated acid or anhydride when the PE is a polyampholyte. As will be recognized, both the acid groups and the imide groups need not necessarily be present in the PE as such, but may be present in the form of their simple derivatives, e.g., salts, as already indicated.

Various methods of application of the water-insoluble basic polyelectrolyte polymers to effect selective separation of non-viral protein from aqueous mixtures containing a plurality of non-viral proteins may be employed and such methods will be apparent to one skilled in the art. The present invention is not limited to any particular method of contacting the aqueous mixture containing the proteins.

In carrying out the process of the present invention the polyelectrolyte polymer can be added to the aqueous mixture with agitation for a period of time sufficient to selectively sorb desired protein and then the polymer containing the sorbed protein can be separated from the aqueous mixture by any suitable procedure, as for example by filtration. Such a procedure is especially advantageous when small volumes of aqueous mixtures are involved.

In an alternate procedure the aqueous mixture can be passed through a bed or a column of the polymer.

The effectiveness of a particular PE in adsorbing particular protein to the substantial exclusion of other protein is particularly related to the pH of the plasma or serum medium and the isoelectric pH (IEpH) of each of the PE, the protein to be adsorbed, and the protein not to be adsorbed, as will become more readily apparent hereinafter. Determination of the IEpH of the above mentioned species is within the skill of the art. IEpH of representative PEs has been determined in isotonic (0.15 M) saline and is given in the table immediately following. The IEpH values were obtained at equilibrium conditions by interpretation of potentiometric pH titration experiments.

After removal of the polymer containing the sorbed protein from the plasma or serum, the protein may be eluted from the polymer if desired. The elution may be carried out by any suitable procedure, for example, it is convenient to add the polymer containing the sorbed protein to a suitable eluant and allow the mixture to stand for a period of time sufficient to effect elution. To shorten elution time it is desirable to agitate the mixture, for example, by shaking or stirring.

The selection of a suitable eluant will depend among other things principally on the particular polyelectrolyte employed and particular protein to be eluted. Generally it has been found that elution is more readily effected when the percent imide content of the polyelectrolyte is at least 2% and is present as diloweralkylaminoloweralkylimide groupings.

TABLE 1

|  | Percent dimethylaminopropylimide | IE pH |
|---|---|---|
| Ethylene/maleic anhydride copolymer | *2 | 3.10 |
|  | 5 | 4.01 |
|  | 10 | 3.98 |
|  | 15 | 4.00 |
|  | 20 | 4.46 |
|  | 30 | 4.90 |
|  | 50 | 5.87 |
|  | 70 | 8.54 |
|  | 100 | 10.30 |
| Isobutylene/maleic anhydride copolymer | 5 | 2.65 |
|  | 10 | 2.64 |
|  | 15 | 2.73 |
|  | 20 | 3.05 |
|  | 30 | 3.75 |
|  | 50 | 7.68 |
|  | 70 | 8.13 |
|  | 100 | 9.20 |
| Styrene/maleic anhydride copolymer | 5 | 2.9 |
|  | 10 | 2.95 |
|  | 15 | 3.48 |
|  | 20 | 3.62 |
|  | 30 | 3.79 |
|  | 50 | 5.85 |
|  | 70 | 7.76 |
|  | 100 | 9.63 |
| 2-methyl pentene-1/maleic anhydride copolymer | 5 | 3.13 |
|  | 10 | 3.40 |
|  | 15 | 4.00 |
|  | 20 | 4.87 |
|  | 30 | 6.70 |
|  | 50 | 7.98 |
|  | 70 | 8.15 |
|  | 100 | 8.82 |

*Methyliminobis (propylimino) linkages.

Any suitable eluant may be employed. Suitable eluants include buffered solutions, for example, borate buffer and phosphate buffer, aqueous solutions containing excess hydroxy ions, for example, aqueous solutions of alkali metal and alkaline earth metal hydroxide and solutions of greater ionic strength, such as salt solutions. Surface active agents also may serve as suitable eluants.

There are numerous applications of the present invention including the selective separation of globulins from serum or plasma, the selective separation of antitrypsin factor from serum or protein, the selective separation of interferon from serum or plasma, and the selective separation of albumin from serum or plasma.

The following preparations and examples are given by way of illustration only.

PREPARATION 1

This preparation illustrates the preparation of a typical maleic acid/$C_2$–$C_{12}$ monoolefin copolymer useful in the preparation of active adsorbent derivatives. A 3-liter glass reactor, fitted with reflux condenser and motor-driven stirring device was charged with 52.3 g. of maleic anhydride, 55.7 g. of styrene, 1500 ml. of benzene, 2.53 g. of 55% active divinyl benzene, equivalent to 1.39 g., or 1 mol percent of active cross-linking agent, and 0.275 g. of benzoyl peroxide. The reactants are heated to the temperature of refluxing benzene and maintained at this temperature with good mixing for 3.5 hours. The polymer was filtered, washed upon the filter with benzene and finally dried in the vacuum oven for 16 hours at 100° C. An essentially quantitative yield of cross-linked styrene/maleic anhydride copolymer was obtained.

PREPARATION 2

A predetermined percentage of anhydride groups in the maleic anhydride copolymer, such as prepared in Preparation 1, can be converted to substituted imide groups by a simple two-step process. To prepare a product containing 50% imide linkages, 0.5 molar unit of styrene/maleic anhydride polymer from Preparation 1, was charged to a glass 1 liter reactor fitted with mechanical stirrer and graduated water trap topped by a reflux condenser. The reactor was then charged with 500 ml. dry xylene and 0.25 mol of a dialkylaminoalkylamine added. A representative amine of this class is the dimethylaminopropylamine. As the reactants were gently warmed with good mixing, the anhydride linkage was opened and the N-substituted amide formed. Heating was continued and the temperature raised to reflux the xylene and to carry off azeotropically the water of reaction as the imide linkages formed.

After the theoretical quantity of water had been distilled from the reactor, the solvent was stripped off under reduced pressure and the product copolymer derivative dried in a vacuum oven.

PREPARATION 3

The copolymer from Preparation 2 containing 50% substituted imide linkages is suitable for use in the present invention. For certain applications a copolymer having a percentage of quaternary salt hydrophilic groups can be prepared by reacting the substituted imide with an alkyl halide. It is possible to convert a calculated proportion of the tertiary nitrogen atoms to quaternary nitrogen atoms by the simple method of warming a suspension of the polymer with a calculated amount of alkyl halide. An inert diluent such as benzene can be employed for the preparation of the quaternary ammonium derivatives. A calculated weight of the imide substituted copolymer, as prepared in Preparation 2, was suspended in benzene to which was added an alkyl halide. The reaction proceeded readily at temperatures from 40 to 60° C. when a halide such as methyl iodide was employed. A reaction period of 30 minutes or less is usually sufficient when an active halide such as a benzyl halide or a lower alkyl halide is employed. If the halide be a chloride, the reaction time is somewhat longer than if the halide portion of the molecule be bromide or iodide. After the heating period was completed, the diluent was stripped off at reduced pressure and the polymer dried in a vacuum oven.

PREPARATION 4

The hydrophilic properties of the various copolymers suitable for the practice of our invention can be increased by an ammoniation step. Ammonia gas is used to convert unreacted anhydride linkages in the copolymer to the half-amide, half-ammonium salt. This reaction can be carried out by adding ammonia to the dry polymer while using thorough mixing, or the ammonia can be added to a suspension of the copolymer in an inert diluent such as benzene. The ammoniation step has been successfully conducted using copolymer as prepared, or can be carried out with a derivative of the copolymer, e.g., copolymer containing imide linkages, copolymer containing substituted imide linkages, or copolymer containing quaternary ammonium compounds prepared from the partial imides.

The ammoniation reaction is accompanied by a temperature rise and proceeds rapidly to 100% conversion of the anhydride linkages. If the reaction is conducted with the dry polymer, excess adsorbed ammonia is stripped from the polymer by treating it under reduced pressure to remove the ammonia. If the ammoniation is conducted with a polymer suspension, excess ammonia is removed along with the inert diluent which is stripped off under reduced pressure.

PREPARATION 5

Preparation of partial dimethylaminopropyl imide, partial butyl imide derivative of crosslinked isobutylene maleic anhydride copolymer Xylene (1 liter) is charged to a reaction vessel equipped with reflux condenser, Dean-Stark water trap and stirrer.

Methylimino-bis-propylamine (1.45 grams) and 1:1 molar copolymer of isobutylenemaleic anhydride (38.5 grams) are added with stirring. The stirred mixture is heated to reflux temperature (140° C.) and is maintained at said temperature for 1 hour. Upon completion of the 1 hour period, dimethylaminopropyl amine (6.38 grams) is added over a three hour period, during which period reflux temperature is maintained. To the resulting reaction mixture is then added butylamine (13.7 grams). Reflux of the reaction mixture is continued for three additional hours. It is then cooled and filtered. The solid product is washed with hexane and dried. The partial dimethylaminopropyl imide, partial butyl imide derivative of crosslinked isobutylene maleic anhydride copolymer is obtained.

PREPARATION 6

Preparation of partial ester aminoamide, partial dimethylaminopropyl amide, partial dimethylaminopropyl imide derivative of crosslinked ethylene-maleic anhydride copolymer Xylene (1 liter) is charged to a reaction vessel equipped with reflux condenser, Dean-Stark water trap and stirrer. Methylimino-bis-propylamine (2.9 grams) and 1:1 molar copolymer of ethylene-maleic anhydride (63.0 grams) are added with stirring. The stirred mixture is heated to reflux temperature (140° C.) and is maintained at said temperature for 1 hour. Upon completion of the 1 hour period dimethylaminopropyl amine (12.75 grams) is added over a three hour period during which period reflux temperature is maintained. The mixture is cooled to 90° C. and additional dimethylaminopropyl amine (12.75 grams) is added. The temperature is maintained at 90° C. for 3 hours. Butanol (18.5 grams) is then added and the temperature is maintained at 90° C. for an additional 2 hour period. The reaction mixture is then cooled and filtered. The solid product is washed with hexane and dried. The partial ester aminoamide, partial dimethylaminopropyl amide, partial dimethylaminopropyl imide derivative of crosslinked ethylene-maleic anhydride copolymer is obtained.

PREPARATION 7

Preparation of partial dimethylaminoethyl ester, partial diethylaminobutyl imide derivative of crosslinked 2-methylpentene-1/maleic anhydride copolymer Xylene (1 liter) is charged to a reaction vessel equipped with reflux condenser, Dean-Stark water trap and stirrer. Methylimino-bis-propylamine (2.9 grams) 1:1 copolymer of 2-methylpentene-1/maleic anhydride copolymer (92.0 grams) and diethylaminobutyl amine (7.2 grams) are added with stirring. The stirred mixture is heated to reflux temperature (140° C.) and maintained at said temperature for 1 hour. The mixture is cooled to 100° C. and dimethylaminoethanol (45.0 grams) is added. The temperature of the reaction mixture is maintained at 100° C. for 5 hours. It is then cooled and filtered. The solid product is washed with hexane and dried. The partial dimethylaminoethyl ester, partial diethylaminobutyl imide derivative of crosslinked 2-methylpentene-1/maleic anhydride copolymer is obtained.

PREPARATION 8

Preparation of partial dimethylaminopropyl imide derivative of crosslinked ethylene-maleic anhydride copolymer Xylene (1 liter) is charged to a reaction vessel equipped with reflux condenser, Dean-Stark water trap and stirrer. Methylimino-bis-propylamine (2.9 grams), 1:1 molar copolymer of ethylene-maleic anhydride and dimethylaminopropyl amine (5.1 grams) are added with stirring. The stirred mixture is heated to reflux temperature (140° C.) and maintained at said temperature for 4 hours. The resulting reaction mixture is cooled and filtered. The solid product is washed with hexane and dried. The partial dimethylaminopropyl imide derivative of crosslinked ethylene-maleic anhydride copolymer is obtained.

PREPARATION 9

The sodium salt of partial dimethylaminopropyl imide derivative of crosslinked ethylene-maleic anhydride is produced upon addition of sodium hydroxide to water containing partial dimethylaminopropyl imide derivative of crosslinked ethylene-maleic anhydride.

PREPARATION 10

The calcium salt of partial dimethylaminopropyl imide derivative of crosslinked ethylene-maleic anhydride is produced by adding partial dimethylaminopropyl imide derivative of cross-linked ethylene-maleic anhydride to water containing calcium hydroxide.

In the same manner, other PE's utilizable in the present invention may be prepared.

EXAMPLE 1

This example shows the selective separation of non-gamma globulin protein from pooled, normal, human serum.

To 10 ml. of pooled human serum containing 1000 mg. percent of gamma globulin, 5000 mg. percent of albumin, 500 mg. percent of alpha-globulin, and 500 mg. percent of beta-globulin was added one gram of styrene/maleic anhydride copolymer. The polymer was crosslinked with divinylbenzene and contained 70% dimethylaminopropylimide groupings. The resulting suspension was agitated for one hour on a shaking apparatus and then centrifuged to sediment the polymer. The supernatant fluid was decanted and tested for protein. The supernatant fluid was found to contain 1000 mg. percent of gamma globulin, the same as before the treatment. The supernatant fluid was substantially free of other proteins, as confirmed by electrophoresis and Lowry's protein determination methods.

EXAMPLE 2

Animal serum (40 ml.) containing lipoproteins which are known to inhibit viruses was divided into four 10 ml. portions, which were marked A, B, C, and D, respectively. Portions A and B were tested, for their ability to inhibit rubella virus, by the hemagglutination inhibition test. Prior to the test, portion B was immunized with rubella virus. Both portions A and B were shown to inhibit rubella virus.

Portions C and D were treated as follows: One gram of styrene/maleic anhydride copolymer was added to 10 ml. of serum. The polymer was crosslinked with divinylbenzene and contained 70% dimethylaminopropylimide groupings. The resulting suspension was agitated for one hour and centrifuged. The supernatant fluid was decanted. Prior to the polymer treatment, portion D was immunized with rubella virus. After treatment with the polymer, portions C and D where each tested for ability to inhibit rubella virus. Portion D was found to inhibit rubella virus in the diagnostic hemagglutination test to a titer of 1:40 while portion C did not inhibit rubella virus. These results indicate that the lipoprotein inhibitor had been removed from portion C.

Since laboratory procedures for the diagnosis of viral diseases require the employment of serum containing antibodies specific for the virus under test, which must be freed of lipoproteinaceous inhibitors commonly present in most human and animal sera, the foregoing procedure and the application of this procedure to sera of other species, both animal and man, and to diagnostic tests for the determination of other viruses, all of which is a part of the present invention, is of obviously very considerable significance.

EXAMPLE 3

To a 10 ml. portion of pooled human serum containing 100 mg. of hemoglobin in the form of heme, a basic protein, was added one gram of polyelectrolyte polymer (crosslinked styrene/maleic anhydride containing 70% dimethylaminopropylimide). The resulting suspension was agitated for one hour and then centrifuged. The supernatant fluid (serum) was decanted. The supernatant fluid or serum was found by analysis to contain all proteins originally present with the exception of heme, as determined by hemoglobinometric standard methods and comparison with control samples which were not exposed to the polyelectrolytes.

Thus, it has been possible to remove from plasma and serum, both human and animal, products that are undesirable for transfusion. For example, the Federal Drug Administration precludes the use of serum or plasma for human transfusion if the serum or plasma contains substantial quantities of ruptured heme (hemoglobin), known as erythrocytes. Since heme is a basic protein, and since proteins in serum and plasma are acidic proteins the selective removal of heme from serum has been accomplished by the use of PEs. Such procedures permit reclaiming of rejected serum and plasma samples that currently must be discarded and are also useful in preparing serum for use as a tissue culture nutrient in laboratory procedures.

EXAMPLE 4

Proteins can be purified by the use of PEs in isotonic salt solutions, either by adsorption of the desired protein to the PEs, with subsequent elution of the desired material, or by selectively removing, by adsorption to the PEs, a number of the proteins in a mixture of proteins, thus leaving certain other proteins in solution in pure form. For example, the results of experiments with a number of purified proteins are described in Table 2, in which three representative PEs were used and selective adsorption of specific proteins was accomplished.

For each of the proteins, a 3-ml. sample containing 100 mg. percent of the protein in purified form was treated with 100 mg. of each PE indicated, for 1 hour on a rotary shaker. Each supernatant fluid was tested for total amount of the protein remaining, as compared to a control sample never exposed to the PE under consideration.

EXAMPLE 5

In accord with the findings of Example 4, the following separations are effected from isotonic salt solution employing cross-linked styrene/maleic anhydride having 100% dimethylaminopropylamine imide groups in the manner of Example 4, in each case one of the proteins being unadsorbed and the indicated protein being adsorbed by the polyelectrolyte:

Casein adsorbed from mixtures with bovine albumin, protamine sulfate, trypsin and gamma globulin, in each case the adsorption of casein being substantially quantitative.

Beta lipoprotein adsorbed from mixtures with bovine albumin, protamine, sulfate, trypsin, and gamma globulin, in each case the adsorption of beta lipoprotein being substantially quantitative.

EXAMPLE 6

In accord with the findings of Example 4, the following separations are effected from isotonic salt solution employing cross-linked styrene/maleic anhydride having 70% dimethylamino-propylamine imide groups in the manner of Example 4, in each case one of the proteins being unadsorbed and the indicated protein being adsorbed by the polyelectrolyte:

Bovine albumin adsorbed from mixtures with trypsin, beta lipoprotein and gamma globulin, the adsorption of bovine albumin being in each case substantially quantitative.

Protamine sulfate adsorbed from mixtures with tryspin, beta lipoprotein, and gamma globulin, the adsorption of protamine sulfate in each case being substantially quantitative.

Casein adsorbed from mixtures with trypsin, beta lipoprotein and gamma globulin, the adsorption of casein being in each case substantially quantitative.

EXAMPLE 7

In accord with the findings of Example 4, the following separations are effected from isotonic salt solution employing cross-linked styrene maleic anhydride having 100% dimethylaminopropylimide groups as methyl iodide quaternary in the manner of Example 4, in each case one of the proteins being unadsorbed and the indicated protein being adsorbed by the polyelectrolyte:

Bovine albumin adsorbed from mixtures thereof with protamine sulfate and beta lipoprotein, the adsorption of bovine albumin in each case being substantially quantitative.

TABLE 2.—ADSORPTION OF PURIFIED PROTEINS ON INSOLUBLE POLYELECTROLYTES

| Protein tested (100 mg % in original and untreated control samples) | Amount of protein (in mg. percent) removed from solution by adsorption to polyelectrolytes | | |
|---|---|---|---|
| | Cross-linked styrene/maleic anhydride [1] | Cross-linked styrene/maleic anhydride [2] | Cross-linked styrene/maleic anhydride [3] |
| Bovine albumin | 0 | 100 | 100 |
| Casein | 100 | 75 | 100 |
| Protamine sulfate | 0 | 100 | 0 |
| Trypsin | 0 | 0 | 100 |
| Beta lipoprotein | 100 | 0 | 0 |
| Gamma globulin | 0 | 0 | 100 |

[1] Having 100% dimethylaminopropylimide groups.
[2] Having 70% dimethylaminopropylimide groups.
[3] Having 100% dimethylaminopropylimide groups as methyl iodide quaternary.

Casein adsorbed from mixtures thereof with protamine sulfate and beta lipoprotein, the adsorption of casein in each case being substantially quantitative.

Trypsin adsorbed from mixtures thereof with protamine sulfate and beta lipoprotein, the adsorption of trypsin in each case being substantially quantitative.

Gamma globulin adsorbed from mixtures thereof with protamine sulfate and beta lipoprotein, the adsorption of gamma globulin in each case being substantially quantitative.

Therefore, it has accordingly been found that mixtures of proteins can be differentially separated to yield purified preparations of a single protein. For example, gamma globulin for passive immunization of man and animals is at present prepared commercially by methods that precipitate not only the gamma globulin but also other serum proteins. Thus the gamma globulin commercially prepared by current methods contains other extraneous serum proteins. It has now been discovered that treatment of serum with PEs, especially a crosslinked styrene/maleic anhydride copolymer containing 70% dimethylaminopropylimide groups, effects removal from the serum of all proteins other than gamma globulin. Thus, the supernatant fluids of such preparations are free of extraneous serum proteins, containing only the desirable gamma globulin.

EXAMPLE 8

This example shows the removal of anti-trypsin factor (ATF) from calf fetal serum using cross-linked polyelectrolyte polymers containing the necessary imide groups.

The procedure was carried out as follows:

Calf fetal serum was diluted 1:30 with distilled water. PE (1 mg.) was added to 4 ml. of the diluted calf fetal serum. The resulting suspension was agitated for about 30 minutes then centrifugated and filtered to remove the PE. An equal volume of trypsin diluted 1:1000 with saline solution was added to the filtered serum. Diluted milk (0.5 ml.) (diluted 1:10 in distilled water) was added thereto and the resulting mixture was heated at 37° C. for 30 minutes. The heated mixture was then observed to determine the presence of ATF. A clear solution shows digestion of the milk by the trypsin thereby indicating substantially complete removal of ATF. In contrast, a cloudy solution shows inhibition of milk digestion by the trypsin thereby indicating presence of ATF. The results are given in Table 3.

As a control, 4 ml. of calf fetal serum diluted 1:30 with distilled water was treated as above with the exception that addition of PE was omitted.

EXAMPLE 9

This example shows the fractionation of calf fetal serum by selectively sorbing specific protein on crosslinked polyelectrolyte polymers containing the necessary imide groups.

The procedure employed in the test was carried out as follows:

300 mg. of PE was suspended in 3 ml. of calf fetal serum. The suspension was agitated for one hour. The suspension was centrifugated at 2,000 r.p.m. for five minutes and the supernatant fluid was decanted. The PE was suspended in 3 ml. of saline solution. The resulting suspension was agitated to elute adsorbed protein from the PE. The PE was removed from the eluate by filtration. The protein content of supernate and eluate were determined by electrophoresis. The results are given in Table 4 below.

EXAMPLE 10

This example shows the fractionation of demineralized calf fetal serum by selectively sorbing specific protein on cross-linked polyelectrolyte polymers containing the necessary imide groups. Minerals were removed from the calf fetal serum by passing the calf fetal serum through an ion exchange resin bed.

The procedure employed in the test was carried out as follows:

300 mg. of PE was suspended in 3 ml. of calf fetal serum. The suspension was agitated for one hour. The suspension was centrifugated at 2,000 r.p.m. for five minutes and the supernatant fluid was decanted. The PE was suspended in 3 ml. of saline solution. The resulting suspension was agitated to elute adsorbed protein from the PE. The PE was removed from the eluate by filtration. The protein content of supernate and the eluate were determined by electrophoresis. The results are given in Table 5 below.

EXAMPLE 11

In the manner of the preceding examples, the basic polyelectrolytes of Preparations 2, 3, 5, 6, 8, 9 and 10 are employed in the selective separation of non-viral protein from fluid media selected from plasma and serum to the substantial exclusion of other non-viral protein present in said fluid media.

The adsorption of a charged protein specie to a charged insoluble substrate surface through electrostatic interactions between sites of opposite charge is related to the isoelectric pH (IEpH) of the species and to the pH of the aqueous medium. The IEpH of any specie is that pH where electrical neutrality (+) to (−) on a number basis exists. At pH values above the IEpH, the individual specie is predominantly negative [more (−) charges than (+) charges] and is thus anionic in nature. Below the IEpH, the reverse is true and the specie is cationic. Electrostatic (ionic) interaction is promoted between species of opposite net charge.

A word of explanation is in order considering a model (an oversimplified system) of a polymer containing only one form of acid group (COOH) and one form of base group ($NR_2$) spaced randomly along the backbone chain:

TABLE 3

| Copolymer | Percent dimethylamino-propylimide groups | Solution condition |
|---|---|---|
| Control | | Cloudy. |
| Isobutylene/maleic anhydride | 30 | Clear. |
| | 50 | Do. |
| | 70 | Do. |
| | *4 | Do. |
| Ethylene/maleic anhydride | 50 | Do. |

*Methyliminobis(propylimide) linkages.

TABLE 4

| Copolymer | Percent dimethyl-iminopropyl-imide | Serum, pH | Super-nate, pH | Eluate, pH | Albumin | | $α_1$ protein | | $α_2$ protein | | $β$ protein | | Globulins | |
|---|---|---|---|---|---|---|---|---|---|---|---|---|---|---|
| | | | | | Super-nate | Elu-ate | Super-nate | Elu-ate | Super-nate | Elu-ate | Super-nate | Elu-ate | Super-nate | Elu-ate |
| Ethylene/maleic anhydride | 15 | 7.9 | 5.5 | 8.2 | ± | + | ± | − | ± | − | ± | − | − | − |
| | 30 | 7.6 | 5.2 | 8.2 | ± | + | − | − | − | − | − | − | − | − |
| | 100 | 7.7 | 8.7 | 8.8 | + | + | + | ± | − | − | − | − | ± | − |
| Styrene/maleic anhydride | 5 | 8.1 | 8.1 | 9.1 | ± | + | ± | − | − | − | − | − | ± | − |
| | 10 | 8.0 | 7.7 | 9.1 | ± | ± | ± | − | ± | − | − | − | ± | ± |
| | 15 | 7.7 | 6.9 | 8.9 | ± | + | − | − | ± | ± | ± | ± | ± | ± |
| | 70 | 7.7 | | 9.1 | + | ± | − | − | − | − | − | − | ± | − |
| Isobutylene/maleic anhydride | 15 | 7.9 | 7.7 | 8.8 | ± | + | − | − | − | − | ± | ± | ± | ± |
| | 50 | 7.7 | 8.4 | 8.9 | ± | ± | − | − | − | − | ± | ± | ± | − |
| 2-methyl pentene-1/maleic anhydride | *4 | 7.9 | 8.5 | 9.2 | ± | ± | − | − | − | − | − | − | ± | − |
| | 5 | 7.8 | 8.1 | 9.1 | ± | ± | − | − | − | − | − | − | ± | − |
| 2-methyl pentene-1/maleic anhydride | 15 | 7.5 | 8.3 | 9.2 | ± | ± | − | − | − | − | − | − | ± | − |
| | 50 | 7.7 | 8.4 | 9.2 | ± | ± | ± | ± | − | − | ± | ± | ± | ± |
| | 70 | 8.0 | 8.6 | 9.2 | ± | ± | − | − | − | − | ± | ± | ± | ± |
| | 100 | 8.1 | 8.6 | 9.2 | ± | ± | ± | ± | − | − | ± | ± | ± | ± |

*Methyliminobis(propylimide) linkages.

NOTES

+ Supernate is substantially free of protein fraction (substantially complete adsorption of protein fraction on PE) or eluate contains substantially all of protein fraction (substantially complete elution of original protein fraction from PE).

± Supernate contains a portion of the protein fraction (detectable adsorption of protein fraction by PE) or eluate contains a portion of the protein fraction (detectable elution of protein fraction from PE).

− Supernate contains substantially all of protein fraction (no detectable adsorption of protein fraction by PE) or eluate is substantially free of protein fraction.

TABLE 5

| Copolymer | Percent dimethyl- imino- propyl- imide | Serum, pH | Super- nate, pH | Eluate, pH | Albumin Super- nate | Albumin Elu- ate | α₁ protein Super- nate | α₁ protein Elu- ate | α₂ protein Super- nate | α₂ protein Elu- ate | β protein Super- nate | β protein Elu- ate | Globulins Super- nate | Globulins Elu- ate |
|---|---|---|---|---|---|---|---|---|---|---|---|---|---|---|
| Ethylene/maleic anhydride | 10 | 7.6 | 6.6 | 8.6 | ± | ± | − | − | − | − | − | − | − | − |
|  | 20 | 7.3 | 7.9 | 7.1 | ± | ± | − | − | − | − | − | − | ± | ± |
| Styrene/maleic anhydride | 5 | 9.5 | 8.7 | 9.2 | ± | ± | − | − | − | − | − | − | − | − |
|  | 10 | 7.3 | 7.7 | 9.2 | ± | ± | − | − | − | − | − | − | − | − |
|  | 15 | 7.3 | 7.7 | 9.2 | ± | ± | ± | − | − | − | − | − | − | − |
|  | 20 | 7.5 | 8.0 | 9.2 | ± | ± | − | − | − | − | − | − | − | − |
|  | 30 | 5.6 | 8.6 | 9.2 | ± | ± | − | − | − | − | − | − | − | − |
|  | 50 | 6.2 | 8.2 | 9.2 | ± | − | − | − | − | − | ± | − | − | − |
|  | 100 | 6.1 | 8.3 | 9.0 | ± | ± | + | ± | ± | − | − | − | ± | ± |
| Isobutylene/maleic anhydride | *4 | 5.7 | 5.7 | 8.7 | ± | ± | ± | ± | ± | ± | − | − | ± | − |
| 2-methyl pentene-1/ maleic anhydride | *4 | 5.7 | 6.4 | 9.2 | ± | ± | − | − | − | − | − | − | − | − |
|  | 5 | 5.6 | 6.9 | 9.2 | ± | ± | − | − | − | − | − | − | − | − |
| 2-methyl pentene-1/ maleic anhydride | 10 | 5.9 | 6.1 | 9.1 | ± | ± | − | − | ± | ± | ± | ± | − | − |
|  | 15 | 6.0 | 6.0 | 9.2 | ± | − | − | − | ± | − | − | − | ± | − |
|  | 50 | 6.8 | 8.1 | 9.2 | ± | ± | − | − | − | − | − | − | − | − |
|  | 70 | 9.2 | 8.7 | 9.2 | ± | ± | − | − | − | − | − | − | − | − |
|  | 100 | 9.2 | 8.7 | 9.2 | ± | ± | ± | − | ± | − | − | − | ± | − |

\* Methyliminobis(propylimide) linkages.

NOTES

\+ Supernate is substantially free of protein fraction (substantially complete adsorption of protein fraction on PE) or eluate contains substantially all of protein fraction (substantially complete elution of original protein fraction from PE).

± Supernate contains a portion of the protein fraction (detectable adsorption of protein fraction by PE) or eluate contains a portion of the protein fraction (detectable elution of protein fraction from PE).

− Supernate contains substantially all of protein fraction (no detectable adsorption of protein fraction by PE) or eluate is substantially free of protein fraction.

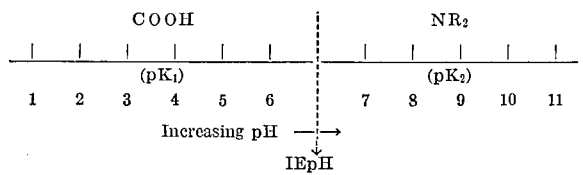

For model (non-polymeric materials) systems, (R)COOH will have a distinct acid strength of $pK_1 = pH4$ and the base, (R)NR$_2$, will have a distinct acid strength of $pK_2 = pH8$. However, polymeric (R)COOH (polyacid) will not titrate sharply at pH4 but will exhibit an extended ionization range of perhaps pH2 through pH8 with an apparent (average) acid strength (conventionally taken at 50% ionization) of $pK_1 = pH4$. Similarly, polymeric (R)NR$_2$ (polybase) will not titrate sharply but may exhibit an extended ionization range from pH6 to pH9, again averaging at $pK_2$ (base) of pH8. Finally, when placed upon the same backbone (polyampholyte), the ionization ranges of each specie may further change and may in fact overlap, or due to mutual interactions, may shift the model $pK_1$ and $pK_2$ values either up or down the pH scale. These shifts depend upon, among other things:

(1) The acid/base, e.g., COOH/NR$_2$, ratio.
(2) Specific nature of acid and base, e.g., COOH and NR$_2$, i.e., pK values.
(3) Composition of backbone chain.

Such changes or group interactions affecting ionization are very pronounced for synthetic polyelectrolytes (PEs) where large numbers of groups are present with resultant smaller distances between groups. In proteins or protein shells the charged groupings are fewer in number and thus farther apart with resulting lower interaction effect. Additionally, proteins are further complicated since acid groups of different pK are present as well as base groups of different $pK_2$.

Referring once more to the model illustration as given above, the NR$_2$ group with apparent $pK_2$ at pH8 extending from pH6 to pH9, means that at all pH values <6, complete protonization of all NR$_2$ groups to the acid form NR$_2$H$^+$ has occurred, and as pH rises from 6 to 9 increasing numbers of NR$_2$H$^+$ become deprotonized (50% at pH8) until at pH9 only uncharged NR$_2$ exists.

The COOH group with apparent $pK_1$ at pH4, extending from pH 2 to 8, means that at all pH values <2 no ionized carboxyl (COO$^-$) is present and only the undissociated COOH is present. As pH is raised from 2 to 8 increasing amounts of undissociated COOH become ionized (deprotonated) to the base form COO$^-$ with 50% being achieved at pH4 and 100% at pH8.

It is thus clear that the number of (−) and (+) charges present at any given pH can and will vary depending upon (1) $pK_1$ of acid,
(2) ionization range of acid,
(3) $pK_2$ of base,
(4) ionization range of base,
(5) acid/base, e.g., COOH/NR$_2$, ratio,
(6) Interactions of acid and base, e.g., COOH and NR$_2$, affecting $pK_1$ and $pK_2$ and ionization ranges,
(7) Types of acid, e.g., COOH, groups present if mixed.
(8) Types of basic, e.g., NR$_2$ groups present if mixed.

Additionally, media ionic strength and type of extraneous ions will further affect numbers 1, 2, 3, 4, and 6 above. Since IEpH is where numbers of (−) equals (+), then ionic strength changes also will alter IEpH.

Again referring to the above model example, on a mole unit basis having equal numbers of acid and base, e.g., COOH and NR$_2$, per mole, i.e., for example 50 of each, the NR$_2$ groups by definition exist as 25:25 NR$_2$H$^+$:NR$_2$ at pH8, an estimated 40:10 at pH7 and 50:0 at pH6. The COOH groups exist as 25:25 COO:COOH at pH4, an estimated 40:10 at pH7 and 50:0 at pH8. Exact ionization may be determined by electrometric titration. Thus equal numbers of (+) and (−) exist at pH7 and this is the IEpH. It follows that below pH7 the number of (+) groups predominate and the polymer is nominally cationic. However between pH2 and 7 negative charges are also present. Above pH7 the number of (−) groups predominate and the polymer is nominally anionic. However between pH7 and 9 positive charges are also present.

Depending on the COOH/NR$_2$ ratio which controls the total available numbers of (+) and (−) charges which can be realized in the system, several parameters change as the pH is varied away from the IEpH.

Net charge or (+) minus (−): At IEpH this is zero or (+) = (−). The farther below the IEpH the greater is the net (+) charge and the farther above the IEpH the greater is the net (−) charge.

Charge distribution: At IEpH this is equal or (+)=(−). Obviously higher percentages (+) to (−) exist at pHs farthest below IEpH with the reverse true above the IEpH.

Total charge or (+) plus (−): if $COOH = NR_2$ then this is highest at IEpH but this can charge variably with the $COOH/NR_2$ ratio in the ampholyte.

Ionic bridging is promoted between species of opposite net charge. However, since all charges are present at certain other pH values, charge distribution and total charge may also variably influence adsorption of oppositely net charged species as media pH varies from IEpH. This is especially so if the materials contain mixed species of acid and basic groups, e.g., COOH or $NR_2$ with widely varying pKs as is true in proteins, etc.

All of the foregoing applies to both synthetic PEs and to proteins or proteinaceous materials, keeping in mind that proteins in general have far fewer acidic or basic components per mole and that these are mixed with respect to specie (pK). These latter properties make the determination of IEpH, charge density, charge distribution, and net charge more difficult for proteins than for synthetic PEs. If the IEpH of both systems is known, specific statements concerning adsorption may be made but as the total system becomes more complex (mixtures of proteins) only generalizations can be made due to competing and/or interfering effects of the miscellaneous components present.

(I) Adsorption of single specie of known IEpH to PE substrate

Materials.—IEpH4 Protein A, IEpH7.5 Protein B, [IEpH (3–10) general case].

Substrate.—Series of PE polyampholytes.

(1) Determine IEpH for series of PE and construct curve of IEpH vs. PE composition. Nature of media, i.e., water vs. saline (ionic strength) must be kept in mind. Generally IEpH in water is 0.5–1.5 pH units higher than in saline.

(2) For each composition the PE will be (−) at pHs higher than IEpH and (+) for pHs lower than IEpH.

(3) Draw in the IEpH line for specie to be adsorbed. IEpH should be in same media as use for 1. above.

(4) If a protein is (−) at the media pH desired, then only those PEs which are (+) at this same pH will adsorb. Conversely, if the protein is (+) at the desired pH, then only those PEs which are (−) at this pH will adsorb.

Examples

For Protein A, IEpH=4, then at all pHs above 4 it is (−) and thus requires a positive PE and only those PEs which are net (+) above 4 will work. The greater the net formal charge difference the better the adsorption so that the formal charge on both species must be considered. At pHs below 4 only those PEs which are net (−) at these pHs will work.

For Protein B, IEpH=7.5, the same considerations apply and thus the PEs applicable to absorb Protein A are different than those for Protein B because of the IEpH differences.

For conditions close to the IEpH of either specie the net charge is low and thus intermediate adsorptions can be expected.

Care must be taken in interpretation of results since the time of the experiment now enters the picture. For example the quantity of protein adsorbed may very well depend upon contact time and thus an intermediate adsorption may result from low contact time. Secondly, since the PE is an insoluble specie the ionization equilibrium is time dependent, varying between PE systems. Thus if equilibrium is not reached in the time of the experiment, an intermediate or small adsorption may occur.

Due to the fact that both (+) and (−) charges are always present at most desired pHs, it is almost impossible to say that one condition yields zero adsorption vs. another condition giving complete 100% adsorption. Such values can only be determined if the assay method used permits and if all conditions were essentially optimum.

Essentially after choosing the PE from 4 above, one would vary pH, time, ionic strength, and type of extraneous inorganic ions to develop the maximum potential of the particular system.

(II) Adsorption of one component preferentially from two specie systems. (Same materials as I above.)

(1) Carry out first 3 steps in I.

(2) Pick a PE whose isoelectric point is intermediate between those of the two adsorbing species and operate at a pH between that of the PE and either specie. The specie with the opposite sign will adsorb preferentially (perhaps quantitatively) to the other.

Example

Thus for Protein A and Protein B with a PE of IEph=5 and operating at pH6, only Protein B (IEpH 7.5) will adsorb.

Additionally, if a PE is chosen with an IEpH of 8.5, A would adsorb preferentially to B, due to the greater net formal charge difference. Some Protein B may absorb but now the A would be present in greater concentration and, after total elution, a second PE intermediate between A and B may effect a better separation.

Again pH, ionic strength, and type of extraneous ions ($H^+$ vs. $Na^+$, etc.) should be investigated since these parameters will affect the absorption of species whose IEpHs are close to the operating pH. Furthermore total charge and charge distribution at the operating pH may become important as will type of charge specie on either the PE or the specie to be adsorbed.

If mixtures adsorb, further separations can be achieved by differential elution with elements of increasing ionic strength at a given pH or series of pHs. Thus fractions more loosely bound (less formal charge difference) will elute first, followed by species which are more tightly bound (greater formal charge difference).

(III) More complicated systems

In such systems the additional quantities and types of proteins present in the raw mixtures complicate the simple picture (based on IEpH) due to the fact that all additional components have their own particular chemical composition, ionization parameters, and IEpH values. Further, some components may adsorb better through $H^+$ exchange while others appear to proceed best through $Na^+$ exchange. Thus possible pretreatment of PE to yield higher "activity" of the desired kind becomes of importance and must be determined since adsorption of the additional components may interfere with protein adsorption by occupying adsorption sites or by altering the charge on the PE substrate. This is especially true if total net charge is low to begin with.

The systems as described apply here and these pH pictures are explained as being those values where the interfering substances adsorb least, thereby giving a greater number of sites for the desired protein specie adsorption to occur.

From the foregoing it will be obvious that the selectivity of one protein adsorption in the presence of other protein will be affected by the type and quantity of undesired protein present as well as the pH at which the adsorption is carried out and other factors. If the type and quantity of undesired protein is such that interference with desired protein adsorption occurs because of attachment to the available sites of the PE, thereby depleting them for desired adsorption, at least under certain conditions, it is apparent that procedural adjustments will have to be made by one skilled in the art to ensure desired adsorption and selective adsorption. Since any undesired protein which does adsorb to the PE has optimum pH ranges for adsorption, as does the protein desired to be selectively adsorbed, one way of proceeding is to conduct a series of controlled pH experiments, varying the pH but maintaining the same PE adsorbent. In this manner, it can readily be determined at what pHs and pH ranges the contaminating or undesired protein do adsorb to the PE, and where they do not so adsorb. Since undesired protein adsorption involves depletion of available attachment sites which could otherwise be employed for selective attachment of desired proteins, carrying out the adsorption procedure, at those pH ranges where undesired protein have been shown not to adsorb by such preliminary pilot experiment, results in enhanced and selective adsorption of the desired result the desired protein may be recovered has been demonstrated.

Should the PE utilized not be sufficiently selective for the desired, result the desired protein may be recovered from the PE by selection of a suitable eluant which selectively elutes the desired protein.

Since many embodiments of this invention may be made and since many changes may be made in the embodiments described, the foregoing is to be interpreted as illustrative only, and the invention is defined by the claims appended hereto.

It is claimed:

1. A method for separating specific non-viral protein from other non-viral protein from a fluid medium selected from the group consisting of plasma and serum and containing a plurality of non-viral proteins comprising the step of contacting said medium with a water-insoluble polyelectrolyte polymer, said polymer being polycationic or polyampholytic in nature, said polymer containing imide groupings selected from the group consisting of diloweralkylaminoloweralkylimide groups and loweralkyliminodi(loweralkylimide) linkages thereby to seectively sorb specific non-viral protein to the substantial exclusion of other non-viral protein and produce a fluid medium containing the non-sorbed protein.

2. The method of claim 1 wherein the polymer is a polymerized unsaturated carboxylic acid or anhydride.

3. The method of claim 1 wherein the polymer is a copolymer of (a) an unsaturated monomer and (b) an unsaturated carboxylic acid or anhydride.

4. The method of claim 1 wherein the polymer has a molecular weight of at least 1000.

5. The method of claim 3 wherein the copolymer is a copolymer of (a) and maleic acid or anhydride.

6. The method of claim 3 wherein (a) is selected from the group consisting of isobutylene, 2-methyl-pentene-1, styrene and ethylene.

7. The method of claim 1 wherein the polymer contains 2–100% diloweralkylaminoloweralkylimide groupings.

8. The method of claim 1 wherein the polymer is styrene/maleic anhydride containing about 70% dimethylaminopropylimide groupings.

9. The method of claim 1 wherein the polymer is isobutylene/maleic anhydride containing about 30% dimethylaminopropylimide groupings.

10. The method of claim 1 wherein sorbtion is effected from a hypotonic serum containing fluid.

11. A method for the selective removal of heme from serum or plasma comprising the step of contacting the heme-containing serum or plasma with a water-insoluble polyelectrolyte polymer, said polymer being polycationic or polyampholytic in nature, said polymer containing imide groupings selected from the group consisting of diloweralkylaminoloweralkylimide groups and loweralkylaminodi(loweralkylimide) linkages, thereby to selectively sorb the heme.

12. The method of claim 11 wherein the polymer is styrene/maleic anhydride containing about 70% dimethylaminopropylimide groups.

13. A method for removing non-gamma globulins from serum or plasma comprising the step of contacting serum or plasma containing gamma globulin and other non-gamma globulin protein with a water-insoluble polyelectrolyte, said polyelectrolyte being polycationic or polyampholytic in nature, said polyelectrolyte containing imide groupings selected from the group consisting of diloweralkylaminoloweralkylimide groups and loweralkyliminodi(loweralkylimide) linkages, thereby to selectively sorb the non-gamma globulin, and removing the polyelectrolyte sorbate from the serum or plasma to leave a gamma globulin containing serum or plasma.

14. The method of claim 13 wherein the polymer is styrene/maleic anhydride containing about 70% dimethylaminopropylimide groupings.

15. A method for selectively sorbing lipoprotein from serum or plasma containing gamma globulin and a lipoprotein comprising the step of contacting the serum or plasma with a water-insoluble polyelectrolyte polymer, said polymer being polycationic or polyampholytic in nature, said polymer containing imide groupings selected from the group consisting of diloweralkylaminoloweralkylimide groups and loweralkyliminodi(loweralkylimide) linkages, to selectively sorb lipoprotein and removing the polymer sorbate from the serum or plasma leaving a gamma globulin containing serum.

16. The method of claim 15 wherein the polymer is styrene/maleic anhydride containing about 70% dimethylaminopropylimide groupings.

17. A method for removing antitrypsin factor from serum or plasma comprising the step of contacting serum or plasma containing antitrypsin factor and other non-viral protein with a water-insoluble polyelectrolyte, said polyelectrolyte being polycationic or polyampholytic in nature, said polyelectrolyte containing imide groupings selected from the group consisting of diloweralkylaminoloweralkylimide groups and loweralkyliminodi(loweralkylimide) linkages thereby to selectively sorb the antitrypsin factor.

18. The method of claim 17 wherein the polymer is isobutylene/maleic anhydride.

References Cited

UNITED STATES PATENTS

| 2,669,559 | 2/1954 | Reid | 260—112 |
| 3,073,747 | 1/1963 | Reid | 260—112X |
| 3,398,092 | 8/1968 | Fields et al. | 424—79 |
| 3,502,545 | 3/1970 | Westman et al. | 260—112X |

OTHER REFERENCES

The Proteins, vol. III, 1965, Neurath, pp. 14–27.

WILLIAM H. SHORT, Primary Examiner

H. SCHAIN, Assistant Examiner

U.S. Cl. X.R.

260—115, 120, 122; 424—79